3,385,891
METHOD FOR THE PRODUCTION OF
AMIDES AND AMIDINES
Donald M. Fenton, Anaheim, Calif., assignor to Union
Oil Company of California, Los Angeles, Calif., a corporation of California
No Drawing. Filed May 13, 1965, Ser. No. 455,622
5 Claims. (Cl. 260—561)

ABSTRACT OF THE DISCLOSURE

The invention comprises the use of mercuric oxide as an oxidant for the oxidation of an alkyl, alkenyl or cyclohexylamine to an amide or amidine. The amidine is formed under anhydrous conditions and the presence of water favors formation of the amide. The oxidation results in reduction of the mercuric oxide to mercury which can be reoxidized by conventional methods for reuse in the process. The oxidation of secondary amines furnishes a convenient route to fully N-substituted amidines as well as providing a convenient route to the production of amides from primary and secondary amines. The reaction is performed at temperatures from 25° to about 300° C. and pressures up to 10,000 p.s.i.g. sufficient to maintain liquid phase conditions.

---

This invention relates to the method for preparing amides and amidines from amines and, in a preferred embodiment, concerns a method for the preparation of fully substituted N,N,N'-tri-substituted amidines. The products of the reaction are useful for a variety of purposes, e.g., surfactants, solvents, herbicides, etc.

While tri-substituted amidines have been prepared previously by processes involving highly complex reactants and method steps; see Patent No. 3,121,084; heretofore there has been no simple method for the direct preparation of these materials.

I have now found that the aforementioned products, i.e., amides and amidines, can be readily prepared by contacting a primary or a secondary amine with mercuric oxide under relatively mild temperatures and liquid phase conditions. The amine is oxidized and the mercuric oxide is reduced to mercury. The reaction yields a mixture of the amide and amidine from the amine and the relative rates of the two reactions can be influenced by the amount of water in the reactants and, if desired, by removal of the water of reaction by suitable and conventional techniques, e.g., refluxing, azeotropic distillation, etc. The removal of water and/or initiation of the reaction under substantially anhydrous conditions favors reaction (II) to produce amidines as the major product. In contrast, initiation of the reaction in the presence of a medium containing 5 percent or more water favors reaction (I) to produce an amide as the major product.

The reaction proceeds according to the following:

I.

$$R_1CH_2NHR_2 + 2HgO \longrightarrow R_1\overset{O}{\overset{\|}{C}}NHR_2 + 2H_2O + 2Hg°$$

II.

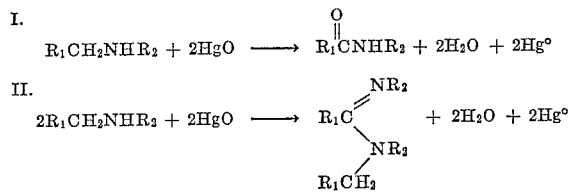

wherein:

$R_1$ and $R_2$ are selected from the class consisting of hydrogen, alkyl, alkenyl and alicyclic groups having from 1 to about 8 carbons.

When the organic amine used as the reactant is a primary amine, i.e., $R_2$ is hydrogen, then the resulting amidines prepared according to reaction II are mono-substituted at the nitrogen. However, when a secondary amine is used, i.e., $R_2$ is also alkyl, alkenyl or alicyclic, then fully substituted amidines are prepared.

Examples of suitable compounds that can be used as reactants include methyl amine, ethyl amine, methyl ethyl amine, diethyl amine, ethyl n-propyl amine, di-n-propyl amine, methyl isopropyl amine, methyl butyl amine, isopropyl butyl amine, dibutyl amine, propyl amyl amine, butyl amyl amine, diamyl amine, methyl isoamyl amine, propyl isohexyl amine, methyl cyclohexyl amine, dicyclohexyl amine, ethyl heptyl amine, butyl heptyl amine, amyl heptyl amine, isopropyl octyl amine, dioctyl amine, etc. Preferably the lower molecular weight amines are used and most preferably the amines having from about 3 to about 6 carbons in the R groups are employed.

The reaction can be conducted in an excess of the reactant amine, the excess serving as the reaction medium. If desired, however, a stoichiometric quantity of the mercuric salt and amine can be employed to insure the complete reaction of the amine. Preferably, however, particularly when a high melting point amine is used, an inert diluent is employed that is liquid at the reaction conditions and inert to the reactants. Examples of suitable organic solvents that can be employed include various ethers such as methyl ethyl ether, diethyl ether, diisoamyl ether, ethyl benzyl ether, diethylene glycol diethyl ether, triethylene glycol diethyl ether, tetraethylene glycol dimethyl ether, etc.

Various esters can also be employed as solvents, e.g., methyl acetate, ethyl acetate, isopropyl acetate, ethyl propionate, sec-butyl acetate, isobutyl acetate, ethyl butyrate, butyl acetate, isoamyl acetate, amyl acetate, isoamyl butyrate, glycol diacetate, isoamyl isovalerate, methyl benzoate, ethyl benzoate, methyl salicylate, propyl benzoate, dibutyl oxalate, etc.

The saturated hydrocarbons can of course be used as suitable inert solvents, e.g., pentane, hexane, heptane, octane, decane, dodecane, kerosene, naphtha, etc.

The reaction can be performed under relatively mild conditions including temperatures from about 25° to about 300° C., preferably from about 50° to about 200° C. The pressure employed is not critical in the reaction and generally any pressure from about atmospheric to 10,000 p.s.i.g. or more can be employed. Preferably the pressure employed is that sufficient to maintain the reactants and/or solvents in liquid phase and thereby insure liquid phase conditions.

As previously mentioned, substantially anhydrous conditions can be practiced to favor amidine production by the continuous removal of water, e.g., by stripping of water from the reaction zone with an inert gas purge or by continuous refluxing of the reactants, condensation of the water vapor and removal from the returned reflux. The water removal can be facilitated at the chosen reaction pressure by addition of a suitable azeotroping agent which can be selected from any of the aforementioned solvents, e.g., methyl acetate, ethyl acetate, etc.

The time for the reaction is variable depending upon the aforecited reaction conditions. In general, the reaction is rapid and complete within 3 minutes to 5 hours. The progress of the reaction can be monitored by observing the amount of reduced mercury formed in the reaction zone or other techniques can be used to observe the disappearance of the reactants or formation of the products.

The reaction can be practiced continuously or discontinuously in a batchwise fashion. The reaction employs the amine and mercury in stoichiometric quantities and these reactants can be initially charged to the reaction zone in such proportions. If desired, to facilitate the separation of the crude product, the amine can be used in excess of the stoichiometric amount to thereby insure complete reduction of the mercuric oxide to mercury which can be easily separated from the organic product. The crude product obtained can be readily freed of the metallic mercury by decanting the product from the mercury layer and filtering the decanted liquid. When an inert organic reaction medium is employed, the product can be recovered therefrom by conventional techniques, e.g., distillation, crystallization and filtration for the high melting point products, extraction, etc. The mercury can be recovered for reuse by simple oxidation techniques to produce mercuric oxide, e.g., contacting of the mercury with oxygen in the presence of a suitable catalyst such as nitric acid.

The solvent after recovery of the desired product therefrom can be combined with mercuric oxide and with further amine reactant for use in the process. When the reaction is practiced in a batchwise fashion, the reactants are simply charged to the reaction zone which is then heated to the desired reaction temperature while maintaining the necessary pressure to maintain the reactants and solvent in liquid phase. Upon substantially complete reduction of the mercury or other monitored variable the batchwise process can be discontinued and the product recovered in the aforementioned method.

In a continuous process the reactants, solvent and mercuric oxide can be continuously charged to the reaction zone and metallic mercury and liquid product can be continuously withdrawn therefrom, separated, the mercury regenerated for reuse, and the product recovered from the solvent and the mercuric oxide and solvent recycled to further contacting.

The process of my invention will now be illustrated by the following examples:

Example 1

A 300 milliliter pressure bomb was charged with 40 grams yellow mercuric oxide and 100 grams di-n-butyl amine. The bomb was closed and heated while rocking to 210° C. and maintained at that temperature for 6 hours. Thereafter the bomb was cooled, opened and the liquid separated to obtain mercury and an organic liquid. The organic liquid was distilled to yield 5 grams of N,N,N'-tributyl butyramidine, boiling point 58°–60° C./1 mm. and refractive index at 24° of 1.4590. Carbon and hydrogen analyses were 76.7 percent carbon and 12.8 percent hydrogen, corresponding to the respective theoretical values of 75.7 and 13.4 percent.

The experiment was repeated with 13 parts di-n-butyl amine and 100 parts of pyridine as an inert solvent. Three grams of the amidine were obtained in the reaction.

The experiment was again repeated with 40 grams of mercuric oxide, 50 grams of di-n-butyl amine and 50 milliliters of water. The reaction mixture was heated to 40° C. and maintained at that temperature for 2 hours and then heated to 110° C. and maintained at that temperature for 2 hours and, finally, heated to 200° C. and maintained at that temperature for 2 additional hours. The bomb was then cooled, opened and the organic products separated from the metallic mercury. An aqueous organic azeotrope was distilled and the organic fraction was redistilled to recover the amidine and N-butylbutyramide, boiling point 95°–100° C./4 mm.

Example 2

To a 300 milliliter pressure bomb was charged 50 grams yellow mercuric oxide and 100 grams of n-butylamine. The mixture was rocked and heated to 50° C. and maintained at that temperature for 2 hours, then heated to 110° C. and maintained at that temperature for 2 hours and, finally, heated to 200° C. and maintained at that temperature for an additional 2 hours. The bomb was cooled, opened and the organic layers separated from the metallic mercury. The organic layer was distilled to give 7 parts N-butylbutyramide, boiling point 95°–100° C./4 mm. This product was formed from the oxidation product, butyramide, reaction with excess butylamine to give the transamidification product.

Example 3

The pressure bomb was charged with 50 grams of water, 42 grams mercuric oxide and 28 grams N-methyl octadecylamine. The bomb was closed and heated to 130° C. and maintained at that temperature for 2 hours, then heated to 200° C. and maintained at that temperature for 2 hours. The liquid product was separated from the mercury and distilled to obtain N-methyl octadecylamide as the oxidized product.

The experiment was repeated with 100 milliliters diethyl amine, 40 grams mercuric oxide and 50 grams water. The reaction was performed at 200° C. for 4 hours and 9 grams of N-ethyl acetamide were obtained.

The preceding examples are intended solely to illustrate a mode of practicing my invention and to demonstrate the results obtainable. It is not intended that these examples be unduly limiting by exclusion of any other mode of practice or other reactants recited herein or obvious therefrom. Rather it is intended that the invention be defined by the reactants and steps and their obvious equivalents set forth in the following claims.

I claim:

1. The oxidation of an amine to an amide or amidine that comprises contacting an amine having the following structure:

$$R_1CH_2NHR_2$$

wherein:
$R_1$ and $R_2$ are selected from the class consisting of hydrogen, cyclohexyl, alkyl and alkenyl groups having 1 to about 8 carbons;

with mercuric oxide in an aqueous reaction medium at reaction conditions sufficient to reduce said mercuric oxide to mercury comprising a temperature from about 25° to 300° C. and a pressure from about atmospheric to 10,000 p.s.i.g., sufficient to maintain liquid phase conditions.

2. The oxidation of claim 1 wherein said amine is a secondary amine.

3. The oxidation of an amine of the following structure:

$$R_1CH_2NHR_2$$

wherein:
$R_1$ and $R_2$ are selected from the class consisting of hydrogen, cyclohexyl, alkyl and alkenyl groups having 1 to about 8 carbons;

which comprises contacting said amine with an aqueous reaction medium containing mercuric oxide at a temperature from about 50° to 200° C. and a pressure sufficient to maintain liquid phase conditions to thereby reduce said mercuric oxide to mercury, separating said mercury from the crude product and recovering therefrom an oxidized product selected from the class consisting of $R_1CONHR_2$ and $R_1CH_2NR_2CR_1NR_2$.

4. The oxidation of an amine to an amidine that comprises contacting an amine having the following structure:

$$R_1CH_2NHR_2$$

wherein:
$R_1$ and $R_2$ are selected from the class consisting of hydrogen, cyclohexyl, alkyl and alkenyl groups having 1 to about 8 carbons;
with mercuric oxide under anhydrous reaction conditions sufficient to reduce said mercuric oxide to mercury comprising a temperature from about 25° to 300° C. and a pressure from about atmospheric to about 10,000 p.s.i.g., sufficient to maintain liquid phase conditions.

5. The oxidation of claim 3 for the production of an amidine wherein said contacting is performed under anhydrous conditions with an anhydrous reaction medium.

References Cited

UNITED STATES PATENTS 3,121,084   2/1964   Winberg _____ 260—268

ALEX MAZEL, *Primary Examiner.*

N. RIZZO, *Examiner.*

J. NARCAVAGE, *Assistant Examiner.*